Figure 1:
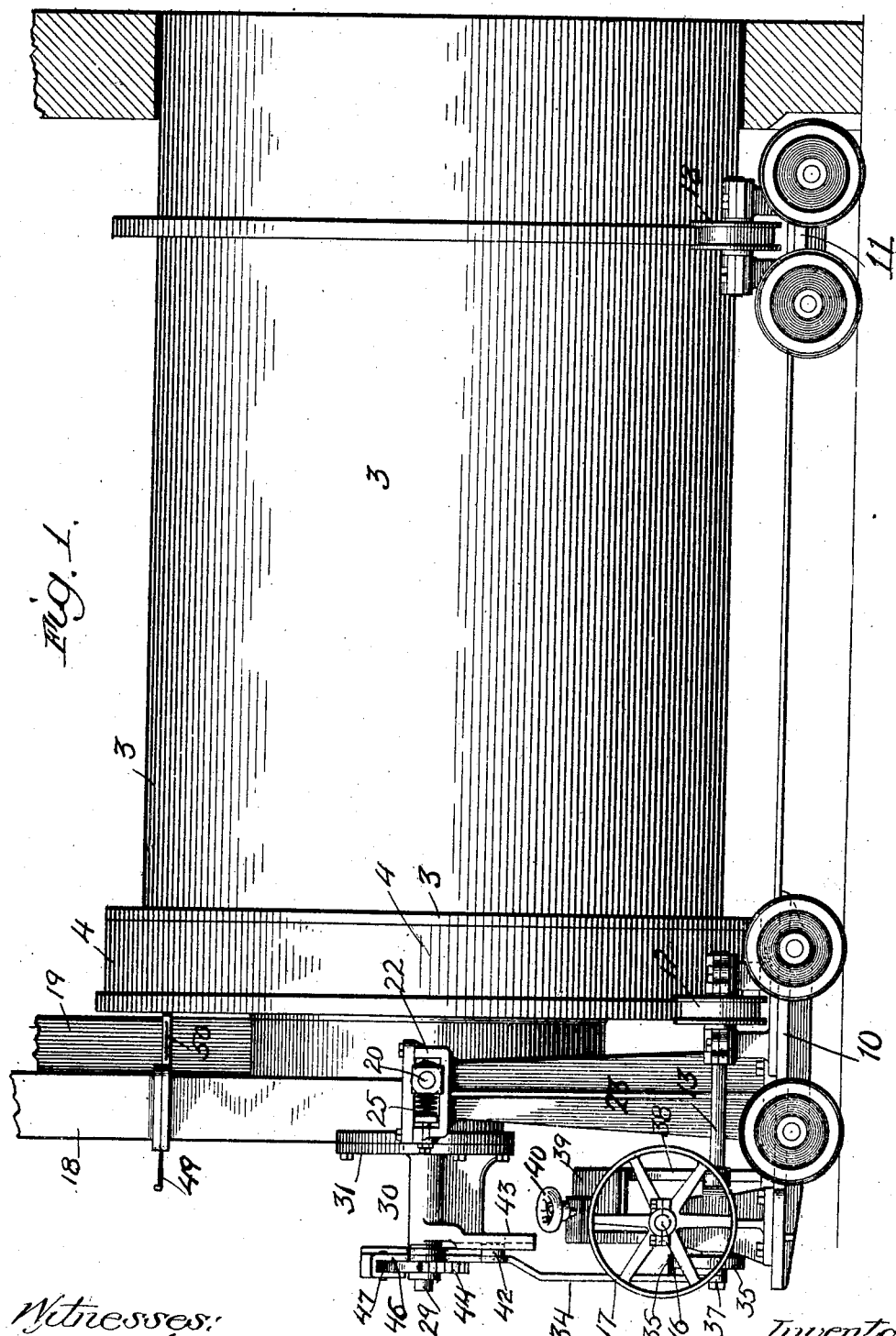

No. 836,145. PATENTED NOV. 20, 1906.
J. M. SCHUTZ.
FUEL BURNER.
APPLICATION FILED JAN. 26, 1903.

4 SHEETS—SHEET 1.

Witnesses:
Inventor:
Joseph M. Schutz,
By Hawley, Atty.

No. 836,145. PATENTED NOV. 20, 1906.
J. M. SCHUTZ.
FUEL BURNER.
APPLICATION FILED JAN. 26, 1903.

4 SHEETS—SHEET 3.

Witnesses:
Harold G. Bautt
E. D. Vreeland

Inventor:
Joseph M. Schutz

By O. H. Hawley, Atty.

No. 836,145. PATENTED NOV. 20, 1906.
J. M. SCHUTZ.
FUEL BURNER.
APPLICATION FILED JAN. 26, 1903.
4 SHEETS—SHEET 4.
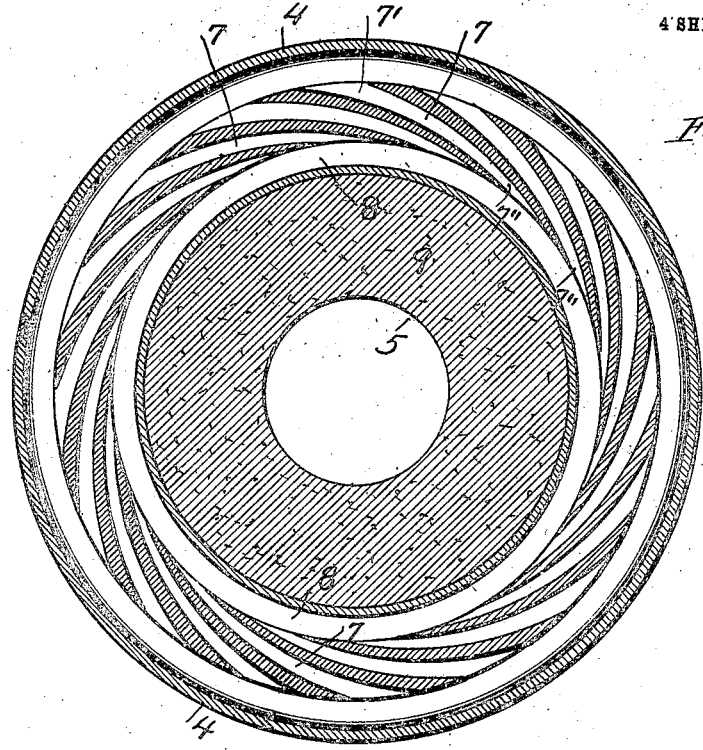
Fig. 4.
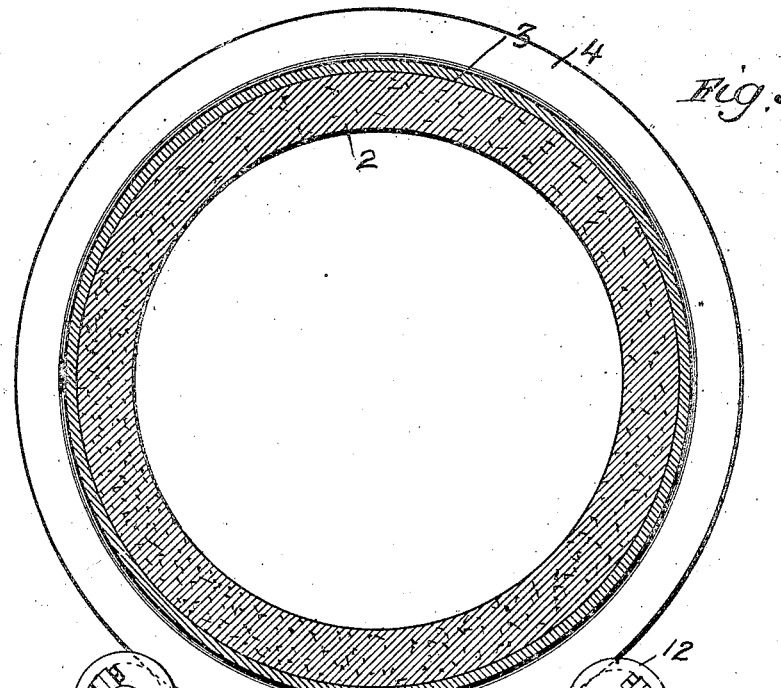
Fig. 5.
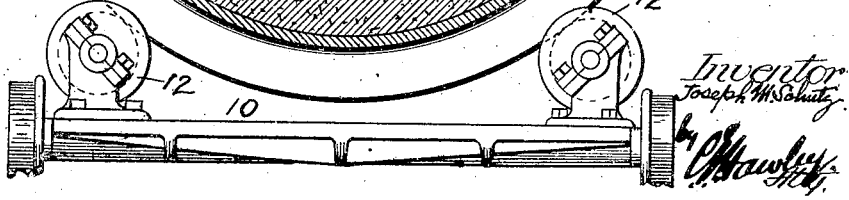

UNITED STATES PATENT OFFICE.

JOSEPH M. SCHUTZ, OF MINNEAPOLIS, MINNESOTA, ASSIGNOR OF ONE-FOURTH TO CHARLES G. HAWLEY.

FUEL-BURNER.

No. 836,145.     Specification of Letters Patent.     Patented Nov. 20, 1906.

Application filed January 26, 1903. Serial No. 140,561.

*To all whom it may concern:*

Be it known that I, JOSEPH M. SCHUTZ, of the city of Minneapolis, county of Hennepin, and State of Minnesota, have invented new and useful Improvements in Fuel-Burners, of which the following is a specification.

This invention relates to the production of heat from fuel, and particularly from broken or pulverized fuel.

Hitherto attempts have been made to burn pulverized fuel, in some cases alone and in others auxiliary to the ordinary grate-fire; but in all such cases that have come to my knowledge it has been necessary to dry and reduce the fuel to a uniform impalpable powder, and the cost of thus preparing the fuel has been prohibitive for ordinary uses, so that even for experimental efforts success has not been claimed and but little progress has been made in the reduction of the art to commercial requirements and uses.

The object of my invention is to provide a device by which it shall be possible to make use of all fuel products that are or may be reduced not to a fine powder, but simply to a broken condition, that will admit of the easy handling of the fuel products.

My invention consists in the combination with a substantially annular, rotative refractory burner open at the end and adapted to withstand intense heat, of means for introducing air and also fuel into said burner and causing said air and fuel to whirl and circulate spirally therein, whereby the fuel particles or bodies are thrown outwardly against or into proximity to the heated walls of the burner, where they are decomposed and ignited.

My invention further consists in the combination of the burner open at one end and adapted to withstand intense heat, of means for introducing air and fuel into said burner at the other end thereof and causing the said air and fuel to travel in a spiral path therein, whereby a vortex or rarefication is caused at the center of said burner, the smoke or unconsumed products of combustion being drawn back into said burner and caused to mix with air and retraverse the heated walls of the same.

The term "fuel" as employed in this specification is intended to embrace not only coal of the better qualities but also the poorer kinds of bituminous coal, such as lignite and the waste or fine parts of all coals known as "screenings." The term also includes gases, oils, wood shavings, and sawdust, combustible mixtures, and garbage products in suitable condition for combustion. In other words, any fuel substance or compound that is capable of being shattered, crushed, pulverized, or separated into particles small enough for easy conveyance or which is already in such condition.

The term "pulverized" as used herein is intended to describe or define that broken state of the fuel, whatever the kind, that will admit of the carrying, distributing, or feeding of the fuel by an air or gas blast of a velocity suited to the requirements of the given furnace plant or by conveyers, elevators, and the like, as distingushed from large lump fuel.

As will be made evident hereinafter, it is unnecessary and even objectionable to reduce the fuel to substantial impalpability, for the reason that in my device combustion is induced not spontaneously, but rather by a series of steps or stages, causing, first, the rapid decomposition of the fuel; second, the ignition of the resulting gases, and, third, a thorough admixture of the burning gases with sufficient air to produce complete or perfect combustion.

My invention will be more readily understood by reference to the accompanying drawings, forming a part of this specification, and in which—

Figure 2:
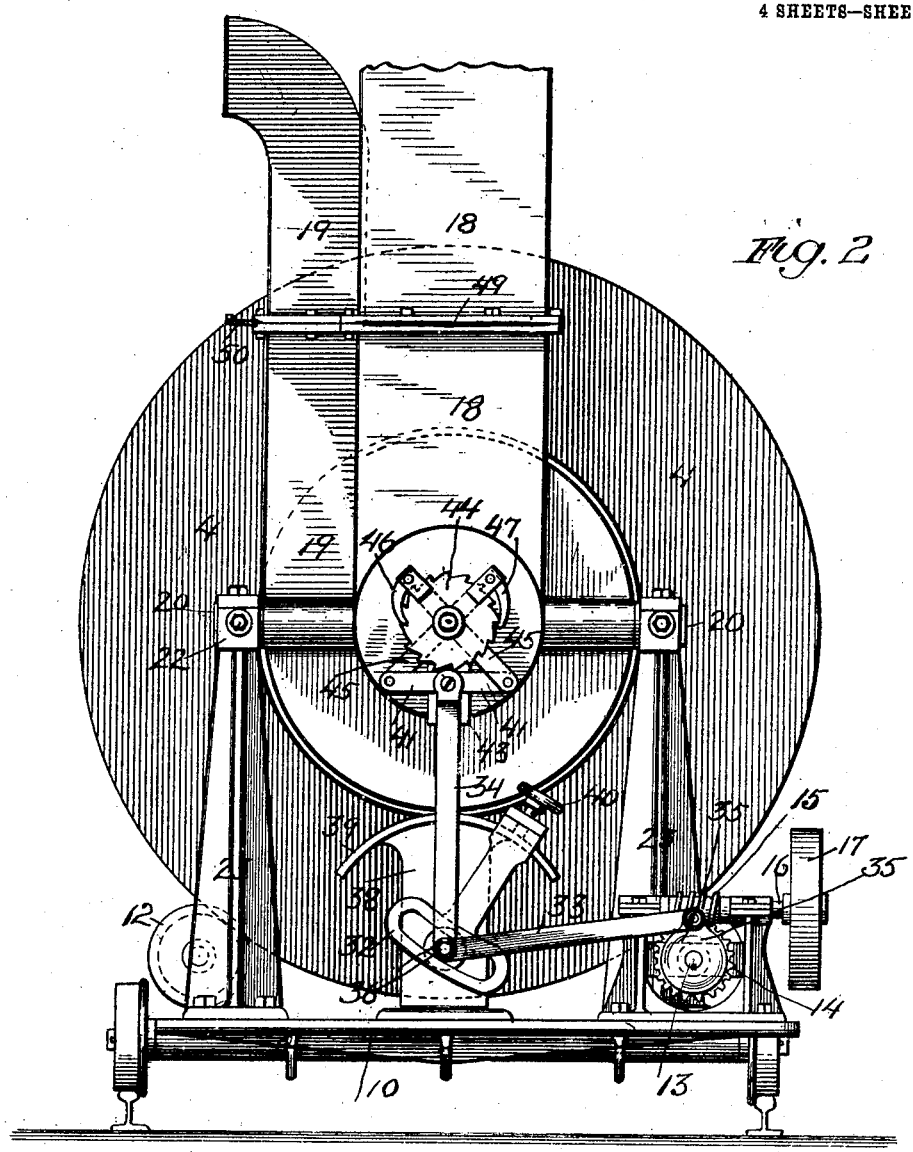
Figure 3:
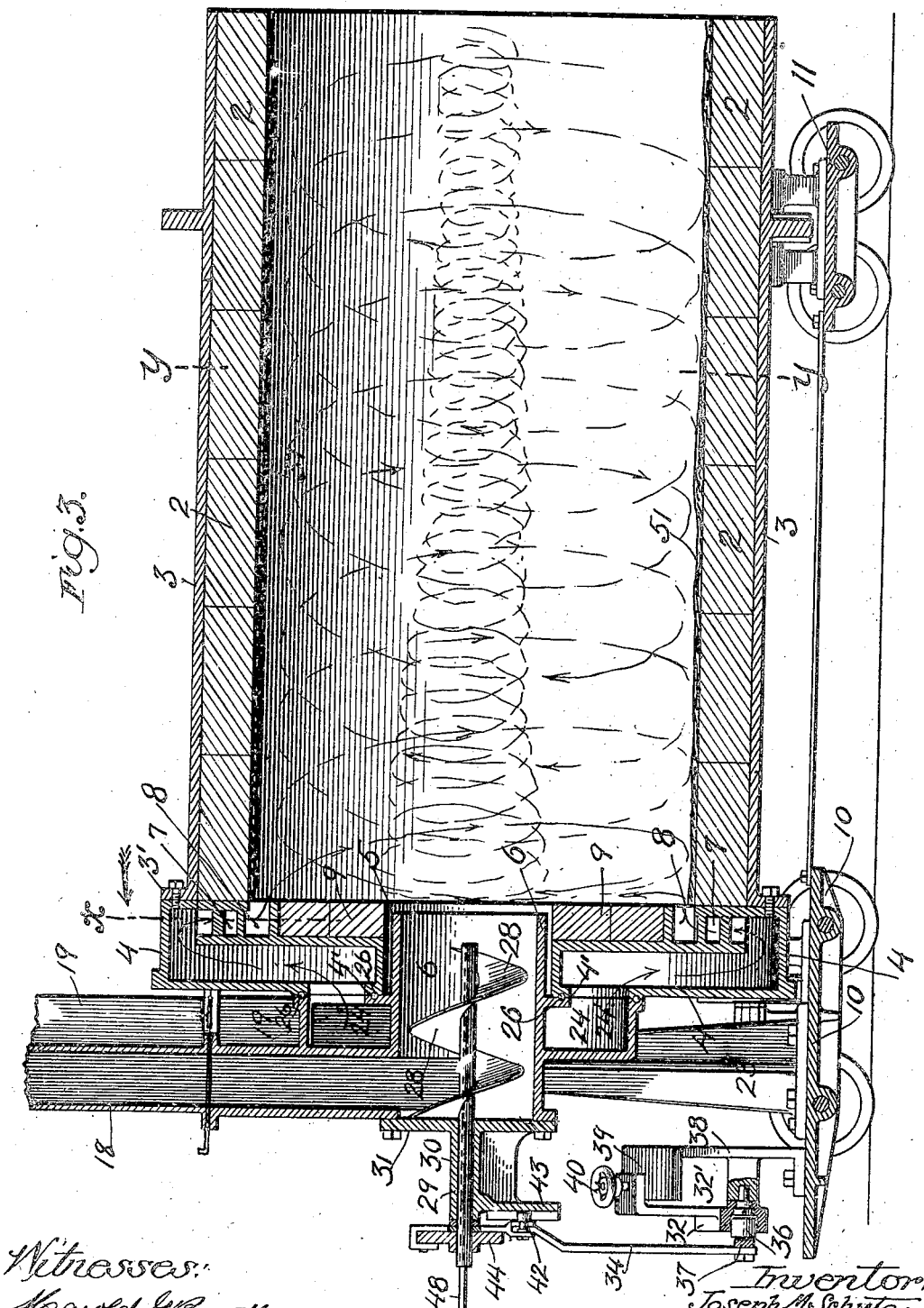

Figure 1 is a side elevation of a fuel-burner embodying my invention. Fig. 2 is an elevation of the outer end thereof. Fig. 3 is a vertical longitudinal section of the burner. Fig. 4 is a transverse vertical section substantially on the line X X of Fig. 3 viewed in the direction of the arrow. Fig. 5 is a vertical transverse section on the line Y Y of Fig. 3.

The burner, as shown in the drawings, is annular or cylindrical or substantially cylindrical in shape. The walls are fireproof or of refractory material, as the same must retain and withstand intense heat. By "refractory" material I mean any material which is inherently of sufficiently difficult fusion to withstand high temperatures or which is rendered difficult of fusion by any of the well-known means, as by a circulating cooling fluid. The end of the burner is open, and from the open end the superheated and burning gases are expelled by the incoming air. This "fuel-laden air," as it may be termed after the admixture is made in the burner, is forcibly blown into the burner in such a way that the air and fuel particles are thrown outward against the burner-walls and move and burn in spiral paths thereupon. The burner interior is intensely hot, and the fuel being held closely upon the same is quickly decomposed, always before reaching the end of the burner. The gas and vapor mixing with the air in the burner causes a vortex or a rarefication at the center, which draws back any smoke or unconsumed products that are crowded away from the hot walls by gaseous expansion, and as a result the flame that emerges from the burner is smokeless. Except in the initial heating of the burner-walls and aside from unavoidable radiation from the furnace-chamber in which the burner is located no heat is lost.

Obviously the burner may be double—that is, open at both ends—with a middle inlet or inlets for air and the fuel products; but for most uses, whether arranged vertically or horizontally, the burner will be made with a closed end, as shown in the drawings. When the burner occupies a horizontal position, I prefer the construction shown in the drawings, wherein an annulus 2, of refractory material, closed at one end and open at the other, constitutes the burner proper. This annulus 2 is preferably incased by a metal cylinder 3 and may be a true cylinder or may be "choked" or flared at its discharge end, according to the nature of the combustible to be consumed or of the particular duty for which the burner is designed. I have illustrated the annulus as made up of blocks or bricks, and in practice I prefer to employ ordinary fire-bricks, my experiments having proven the same to be enduring. The end of the annulus is closed by the hollow head 4, provided with a central opening 5 to receive the end of the fuel-feeding tube or sleeve 6. The head 4 is attached to the flange 3' of the casing 3 and with said casing may be covered with any suitable material to prevent the radiation of the heat from the burner. Within the head and near its periphery I provide a large number of spiral or tangential air ducts or inlets 7, that lead into the annulus. These ducts or inlets 7 are preferably larger at their intake ends 7' than at their discharge ends 7" and have the effect of compressing the air which is forced through them, thereby increasing its velocity as it enters the annular space 8 in the inner face of the head 7. This inner face constitutes the closed end of the annulus, and the metal head is protected by the fire-brick lining 9, that is set in the recess of the head. The lining, like the head, is provided with a central opening to admit the fuel-tube. The burner is preferably mounted upon two trucks 10 11, each of which is provided with carrying-pulleys 12, preferably grooved, as shown in Fig. 1, and upon which the annular or cylindrical burner may be rotated by the expenditure of very little power. The burner is rotated at a slow speed through the medium of one of the carrying-pulleys 12, which is arranged upon a shaft 13, having a worm-gear 14, engaged with the driving-worm 15 upon the driven shaft 16, from which the fuel-feeder is operated. 17 is the small driving-pulley, operated by a belt and which may be replaced by a small motor mounted upon the rear or outer truck of the burner.

It will be observed that the fuel-tube does not rotate, but is provided in the same casting with the fuel and air tubes or chutes 18 and 19, and which casting is provided with side trunnions 20, that are carried in the bearings 22 upon the tops of the standards 23 on the truck 10. The fuel-chute or intake-tube communicates directly with the rear end of the fuel-tube 6, while the air-inlet spout or tube 19 communicates with the annular chamber 24, that surrounds the fuel-tube 6. This portion, or, as it has been termed "casting," is machined or faced off to run against the machined surfaces 4' of the head 4 and is pressed against the same by springs 25, that are placed in the bearings 22 back of the trunnions 20. The inner face of said casting or stationary feeding-head is provided with an annular opening or series of openings 24', and the outer face or end of the head 4 is provided with a corresponding opening or openings whereby the air that is forced through the tube 19 may freely enter the head 4 at all times, although said head 4 is in rotation with the annulus or burner proper. The bearing-faces between the feeding-head and the head 4 are provided with annular grooves 26, into which I force a heavy lubricant to lubricate the joint and also pack the same to prevent the escape of air at the joint. The fuel, instead of being introduced with the air, as in my earlier experiments, is simply pushed through the opening at the center of the closed end of the burner and falling into the bottom thereof is picked up by the moving hot burner-walls and the whirling air and spread upon the inner walls of the burner.

Various devices may be employed for projecting or feeding the fuel to the burner; but I prefer the simple short screw or conveyer 28, working in the feed-tube 6. This conveyer is arranged on the shaft 29, that has a bearing 30 on the detachable plate 31. The shaft and the screw are rotated from the driving-shaft 16. A direct connection may be made between the two shafts; but as this would necessitate and result in a practically fixed speed for the feed-screw or conveyer 28

I prefer to use the speed-regulating connection that is shown in the drawings. This connection comprises the adjustable cam or link 32, the connecting-rod 33, extending from a crank 35 on the shaft 13, the variable throw-rod 34, the sliding block or roll 36, having a pivot 37 common to the rods 33 and 34, and the ratchet mechanism by which the rod 34 is connected with the feed-screw shaft 29. The cam or link 32 has its own pivot 32' on the web 38 of the quadrant 39, and the link 32 may be secured in any of its positions by means of the hand-screw 40, that engages the quadrant 39.

It will be evident that by altering the inclination of the link 32 the throw of the rod or bar 34 may be regulated from zero to the maximum throw that may be imparted to it through the medium of the sliding block or roll 36, actuated from the crank and the stroke of which is fixed. The upper end of the bar 34 is provided with a block or roller 42, held in the guide 43, that depends from the bearing 30 on the plate 31. To the upper end of the bar I attach the lazy-tongs, comprising the links 41 41 and the levers 45, the latter being pivoted upon journals on the shaft 29.

44 is a ratchet-wheel secured on the shaft 29 and engaged by the pawls 46 47 on the two levers 45. One is a plain pawl and the other is hooked, so that the ratchet is advanced one notch for each throw or movement of the bar 34 whether the stroke be up or down. The ratchet may be provided with a greater number of teeth, and overlapping pawls may be employed, if it is desired to secure a closer adjustment of the rotation of the shaft 29 with relation to the rotation of the shaft 13. Obviously the stroke of the pawls upon the ratchet-wheel will vary according to the inclination of the link or cam 32. By this mechanism I am able to adjust the fuel-feed with great accuracy and am able to vary the feed to any desired degree. When the link 32 is thrown to the horizontal position, the rod 33 will operate without imparting vertical movement to the rod 34. Therefore the feed-screw of the burner will not be operated at such a time, and the supply of fuel to the burner will be cut off.

48 represents a valved oil-pipe communicating with the shaft 29, which being hollow serves as a convenient means of introducing oil to the interior of the burner. Suitable valves or slides 49 and 50 are provided in the fuel and air chutes, respectively, for controlling the supply of fuel and air to the burner. The interior of the burner is lined or faced with a glaze or film 51, composed of a metalloid or a composition of metalloids, the fusing point or temperature of which is very high, approximating 3,000° Fahrenheit and resisting volatilization until a much higher temperature is reached. This may be applied originally—that is, when the burner is first lined with refractory material; but I find that it is unnecessary so to do, as the desired metalloids, such as sulfate of iron, are present in most fuels, and these being fused by the intense heat in the burner accumulate and spread upon the walls, constituting a glazing of slag when the burner is cold and constituting a molten film when the burner is in operation and which is constantly added to from the decomposed fuel in combustion. The percentage of high-proof metalloids present in coal of various kinds is so high that the lining or film is not only maintained at all times, but considerable quantities are thrown off from the burner as slag, comprising the same and the ash. Because of this high-proof glazing or film I am able to employ and easily maintain the annulus of ordinary refractory fire clay or brick, which otherwise would quickly melt down in the presence of the great heat created by the forced concentrated combustion that takes place within the burner. In burning oils which contain small percentages of metallic impurities I find it desirable to introduce small quantities of sulfate of iron and the like, which being quickly fused spread upon and protect the walls of the burner. It is obvious that refractory annuli may be prepared initially in this manner before being put into regular service.

While my invention is not confined to a burner of the detailed construction herein shown and described or to a burner of any certain size or proportion of parts, a statement of typical facts and dimensions will facilitate the understanding of the principles embodied in and the operation of the burner. Thus the burner illustrated may be described as being six feet in internal length, three feet in internal diameter, rotated from three to five times per minute, supplied with air in ample volumes, and traveling with a velocity of from eight to fifteen thousand feet a minute, and supplied with fuel in proper proportion to the supply of air, or vice versa. The capacity of the burner for producing heat is dependent upon the limitation imposed by the ability of the annulus to withstand fusion and within such limits is dependent upon the supply of fuel and the velocity of the properly-proportioned quantity of air that is driven into the burner for the combustion of the fuel rather than upon the dimensions of the burner. Assuming that the pressure of air was such as to yield a velocity of eight thousand feet per minute circularly or spirally upon the walls of the burner, a burner of the foregoing dimensions would consume about one ton of broken coal per hour. The operation in detail is as follows:

The open end or mouth of the burner is moved up to and thrust into a suitable opening in the fire-box or combustion-chamber to be heated. The plate 30, with the conveyer or feed-screw, is then removed from the feeding-head, and a supply of shavings and kindling is thrown into the burner. This is ignited and then the air-blast is turned on and the air entering through the tangential twyers whirls with great velocity upon the walls of the burner, centrifugal force operating to confine the air to said walls. The whirling blast within the burner causes the kindling to burn furiously and the burner is quickly brought to a temperature that will admit of the introduction of more difficultly combustible fuel. The feed screw or conveyer is then replaced in the feed-tube and the crushed coal or other fuel is let down into said tube. Thereupon the belt is placed upon the driving-pulley 17 and the burner is set into rotation, likewise the feed screw or conveyer. Thus the fuel begins to be automatically fed into the hot burner and falling to the bottom of the burner is instantly caught up by the strong whirling blast of air and is thrown forcibly against the hot walls and spread thereon. The velocity of the whirling currents is such that it will cause even large particles of coal to rotate within the walls of the annulus, the same taking a spiral path toward the open end thereof. This spiral, marked by the progress of an incombustible particle, has a great number of convolutions within the burner and before it emerges from the end thereof, the same being due to the fact that the centrifugal force that is developed by the whirling air exceeds the crowding force of the incoming air which would produce longitudinal movement of the particles within the burner. From the beginning the finely-divided portion of the fuel will be burned in the burner and the heat generated thereby and by the original kindling under the forced draft or blast quickly raises the refractory walls of the burner to a high temperature, every unit of heat stored therein adding intensity to the combustion within the burner, and vice versa, until the walls of the burner become incandescent and the heat thereof so great that the particles of fuel striking and traveling thereon or even closely approaching the said hot walls in the whirling air-current will be almost instantly decomposed, the gases thereof being added to the elements of the air, which latter has obviously been superheated by contact with the hot walls. Ignition takes place almost simultaneously with decomposition, and the gases in combustion form a whirling flame that emerges from the burner at white heat. The burning of a gas-flame within the burner would not be sufficient under ordinary conditions to maintain the walls thereof at incandescence; but by whirling the body of air, gas, and fuel centrifugal force is developed to hold the combustible products in close contact with the walls of the burner, which receive the initial and greatest heat of combustion of the particles of fuel thereon, the heat being thus constantly imparted to the burner-walls and by them to the fresh products entering the burner.

The walls of the burner are of comparatively small area, and little heat is lost therein. The annular form of the burner and the spiral path of the fuel particles therein insure sufficiently-long contact between the fuel and the walls to produce decomposition and ignition. The whirling of the dust-laden air upon the walls of the burner and the flame therefrom tends to cause a vacuum and vortex at the center of the cylinder, and this draws back any unconsumed products of combustion that escape into the fire-chamber of the furnace or which are forced toward the center of the burner by expansion of the gases within the same. The result is complete combustion, save for a minute quantity of the fine ashes and the metalloids referred to. Smoke is not thrown off by the furnace except during the first two or three minutes of the starting of the fire. The intensity of of the flame of the burner is regulated by the supply of pulverized or broken fuel and by the velocity of the air-blast, and the degree of heat that is attainable is very high. It is preferred that the burner shall project into a furnace-space or combustion-chamber that is larger than the burner, whereby the velocity of the burning gases is reduced after leaving the burner and the pressure thereof also reduced, the effect being to retain the heat in the combustion-chamber for a longer time and to perceptibly increase the vacuum or vortex or return current in the burner.

As before explained, if the burner has not previously been lined with high-proof metalloids or slag it will quickly become coated therewith from the fused fuel products. The rotation of the burner may be increased to such an extent as to develop centrifugal force within the burner to retain the fuel particles and the air upon the walls thereof; but I prefer to operate the same at a slow speed, and thereby consume little power. The slow rotation of the burner prevents the collection or massing of any considerable quantity of slag in the bottom of the burner, which collection would tend to deflect the fuel particles from their rotary paths and to cause them to fly through the burner unconsumed. In addition to this advantage gained by the rotation of the burner it has another function—namely, that of constantly bringing the necessarily hotter top of the burner annulus down to the freshly-admitted fuel, markedly increasing the rapidity of the fuel decomposition. When oil is introduced to the burner at either end thereof, it is drawn to the closed end by the vortex and is projected to the hot walls of the burner, being there burned with great rapidity.

It is obvious that solid and fluid fuel may be used simultaneously in my burner. The feed-screw operates at any desired speed within the capacity of the burner, and the feed-tube 6 is kept full of the pulverized or broken fuel, always presenting a wall of fuel at the end of the burner. The wall of fuel thus exposed to the heat of the burner, and which protects the feed-screw, insures the drying of the fuel practically before it reaches the hot walls of the burner. I am able, therefore, to burn fuel that contains a large percentage of water and wholly avoid the common necessity of drying the fuel before feeding it to the burner.

There are many fuel products which at present are practically worthless on account of the matting of the fuel when burned on an ordinary grate and also because of the presence in many of the fuels of elements, aside from carbon, which are ordinarily incombustible. The capacity of my fuel-burner to develop an intense heat makes it possible to consume many elements and products which under present methods are either deposited in the furnace chamber or flues or go into the ashes. In the actual operation of this burner the quantity of ashes is so small that for all practical purposes the combustion may be termed complete and perfect, every possible unit of heat being extracted from the fuel.

With a given area of refractory material the annulus offers the longest path of travel for the fuel particles, and the annular burner is therefore preferred; but satisfactory burners, as distinguished from the furnace-chamber in which the same are used, may be built in any desired shape, either circular or polygonal, or may take the form of a series of circular or polygonal walls that are kept hot by combustion taking place thereon or which may be heated in any other way. The burner may also be placed in an inverted position with the open end at the bottom thereof and the air and fuel introduced at the upper end of same.

It is obvious that many further modifications of my invention will readily suggest themselves to one skilled in the art, and I therefore do not confine my invention to the specific constructions herein shown and described.

Having thus described my invention, I claim as new and desire to secure by Letters Patent—

1. In a fuel-burner, a hollow annulus having a refractory inner surface, said annulus being closed at one end and open at the other, and provided with a fuel-inlet and a tangential air-inlet at its closed end, substantially as described.

2. In a fuel-burner, the combination of the annular burner proper, open at one end and lined with refractory material, with a tangential air-inlet for said burner, a fuel-inlet, by which the fuel and air admitted are admixed and caused to whirl within the lining of the burner, substantially as described.

3. In a fuel-burner, the combination of the substantially cylindrical burner, lined with refractory material, with means provided at the end of the burner remote from the discharge end thereof through which the fuel and air are separately directed into the burner and caused to whirl therein, and means for regulating the velocity of the air and the quantity of fuel, substantially as described.

4. In a fuel-burner, the combination with the annulus of refractory material open at one end, and provided with separate fuel and air openings at the other end, of means for forcing fuel and air through said openings and whirling the fuel and air in said annulus, substantially as described.

5. The combination of means for creating an axially and longitudinally moving current of air, with a hollow cylinder or annulus of refractory material for confining said current of air, means for mixing fuel in a divided condition with said air in said annulus, and the fire-chamber into which said cylinder or annulus opens, substantially as described.

6. In a fuel-burner, the combination of the annulus, having walls of refractory material, with means for supplying fuel to the annulus, the multiple tangential air-inlet for the annulus through which air enters the same and with the fuel progresses spirally upon the walls of the annulus to the open end of the annulus, substantially as described.

7. The fuel-burner, comprising the annulus having the interior refractory ignition-surface, said annulus having an open end and provided with a fuel-opening and a multiple tangential air-inlet at a point remote from said end, in combination with a fire-chamber of greater size than said annulus and into which said annulus opens, substantially as described.

8. The rotary refractory annulus rendered non-fusible, under temperatures attained, by an internal film of slag of higher refractoriness, in combination with means for feeding air and fuel into said annulus and means for slowly rotating the same to maintain said film, substantially as described.

9. The refractory burner-annulus open at one end and closed at the other and provided with a central fuel-entrance opening in its closed end, also a plurality of peripheral tangential air-feeding openings, in combination with means for feeding fuel and air to respective openings in the annulus, means for rotating said annulus and a film of high-proof metalloids protecting the inner surface of said annulus, substantially as described.

10. The fuel-burner comprising in combination with the refractory annulus open at one end and provided with a tangential air-inlet at its other end, means for feeding fuel into that end of the burner having said inlet, and means for rotating the annulus, substantially as described.

11. The annulus of refractory material mounted for rotation, in combination with means for continuously supplying air tangentially into said annulus toward the open end thereof, and means for continuously mixing fuel within the annulus with the air thus supplied to the annulus, substantially as described.

12. In a fuel-burner, the combination of the rotary annulus, with a plurality of tangential air-inlets at the end thereof and said end having a central opening for the introduction of fuel, substantially as described.

13. In a fuel-burner, the combination with the refractory annulus mounted for rotation and open at one end, the air-feeding head at the opposite end of the annulus and provided with a plurality of tangential twyers leading into the annulus, and fuel-feeding means, substantially as described.

14. In a fuel-burner, the combination of the refractory annulus, open at one end, with an air-feeding head at the other end of the annulus and provided with a plurality of tangential twyers leading into the annulus, and means at the end of the annulus for introducing fuel thereinto, substantially as described.

15. In a fuel-burner, the combination of the burner-annulus open at one end, with a fuel-feeding head therefor provided with a plurality of tangential air-blast twyers, and the fuel-feeding tube located in said head, substantially as described.

16. In a fuel-burner, the combination of the rotary burner-annulus with the twyer-head thereon containing a plurality of tangential twyers, means for supplying air thereto, and a stationary fuel-feeder for discharging fuel through said head into the annulus, substantially as described.

17. The rotary burner-annulus, in combination with the twyer-head thereon containing a plurality of inwardly-leading tangential twyers, and a single central fuel-feeder located in said head, substantially as described.

18. The rotary burner-annulus provided with a plurality of tangential twyers at one end and a stationary fuel-feeder centrally entering said end, substantially as described.

19. The rotary cylinder provided with a refractory lining and open at one end, in combination with the twyer-head closing the other end of the cylinder and containing a plurality of tangential air-twyers and a central fuel-entrance opening, and the air and fuel feeding head having a stationary support at the closed end of the cylinder and containing passages which communicate with said twyers and said fuel-opening respectively, substantially as described.

20. The burner-annulus provided with the twyer-head containing one or more tangential twyers, said head having a central opening, and the separable air and fuel feeding head supported against said twyer-head, combined substantially as described.

21. The rotary cylinder having a refractory lining and provided with the head having a central opening and also having a plurality of tangential twyers, in combination with the stationary air and fuel feeding head axially concentric with said cylinder, held against rotation and pressed against the head of the cylinder, substantially as described.

22. The burner-annulus, in combination with the truck whereon said annulus is mounted for rotation, means for tangentially blasting air into said annulus, the fuel-feeder arranged on said truck and entering said annulus, and means on said truck for operating said feeder, substantially as described.

23. The burner-annulus provided with a tangential twyer-head having a central opening, in combination with means for rotating said annulus and head, the stationary air and fuel feeding head forced against said twyer-head, and suitable means for lubricating and packing the engaging surfaces of said head, substantially as described.

24. The burner-annulus provided with the twyer-head containing a plurality of tangential twyers and having a central opening, in combination with the fuel-feeding tube entering said opening, the feeding device in said tube, and regulable means for operating said feeding means, substantially as described.

25. The burner-annulus, in combination with the hollow twyer-head containing a plurality of inwardly-leading tangential twyers smaller at their inner ends than at their outer ends, and suitable fuel-feeding means, substantially as described.

In witness whereof I have hereunto set my hand, this 12th day of January, 1903, at Chicago, Cook county, Illinois.

JOSEPH M. SCHUTZ.

In presence of—
E. G. VREELAND,
C. G. HAWLEY.